(12) United States Patent
Lobo et al.

(10) Patent No.: US 7,696,270 B2
(45) Date of Patent: Apr. 13, 2010

(54) METHOD OF MANUFACTURING A WAX DISPERSION

(75) Inventors: Lloyd A. Lobo, Rochester, NY (US); Lori A. VanEpps, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 890 days.

(21) Appl. No.: 11/472,764

(22) Filed: Jun. 22, 2006

(65) Prior Publication Data

US 2007/0299191 A1 Dec. 27, 2007

(51) Int. Cl.
*C08J 3/22* (2006.01)
*C08K 5/07* (2006.01)
*C08L 91/06* (2006.01)
*G03G 5/00* (2006.01)

(52) U.S. Cl. ............ 524/277; 430/137.18; 430/137.19; 524/210; 524/232; 524/251; 524/275; 524/311; 524/314; 524/315; 524/356; 524/360; 524/361; 524/364; 524/365; 524/462; 524/464; 524/468; 524/487

(58) Field of Classification Search .................. 524/232, 524/275, 277, 311, 314, 315, 462, 464, 468, 524/487, 210, 251, 356, 360, 361, 364, 365; 430/137.18, 137.19
See application file for complete search history.

(56) References Cited

U.S. PATENT DOCUMENTS

| 3,057,756 | A | * | 10/1962 | Cornwell | 428/452 |
|---|---|---|---|---|---|
| 3,446,761 | A | * | 5/1969 | Antonelli et al. | 524/30 |
| 5,482,812 | A | * | 1/1996 | Hopper et al. | 430/137.14 |
| 5,756,244 | A | | 5/1998 | Omatsu et al. | |
| 6,210,853 | B1 | | 4/2001 | Patel et al. | |
| 6,682,866 | B2 | | 1/2004 | Sugiyama et al. | |
| 6,800,412 | B2 | | 10/2004 | Sugiyama et al. | |
| 6,808,851 | B2 | | 10/2004 | Bartel et al. | |
| 6,824,945 | B2 | | 11/2004 | Emoto et al. | |
| 6,849,371 | B2 | | 2/2005 | Sacripante et al. | |
| 7,056,637 | B2 | * | 6/2006 | Fields et al. | 430/108.8 |
| 2004/0044108 | A1 | | 3/2004 | Agur et al. | |
| 2004/0115551 | A1 | | 6/2004 | Sugiyama et al. | |
| 2004/0161687 | A1 | | 8/2004 | Kim et al. | |

FOREIGN PATENT DOCUMENTS

| JP | 2000318328 | 11/2000 |
|---|---|---|
| JP | 2000326643 | 11/2000 |

OTHER PUBLICATIONS

Database CA (Online), Chemical Abstracts Service, Columbus, OH, US; Naito, Akira et al: "Thermal-transfer recording medium and manufacture thereof" XP002461083, retrieved from STN, Database accession No. 2000:833162, abstract, JP 2000 326643 A (Toppan Printing Co., Ltd., Japan) Nov. 28, 2000.
Database CA (Online), Chemical Abstracts Service, Columbus, Ohio, US; Shiina, Yoshiaki et al: "Thermal transfer printing material and manufacture thereof" XP002461084, retrieved from STN, Database accession No. 2000:819117, abstract, JP 2000 318328 A (Toppan Printing Co., Ltd., Japan) Nov. 21, 2000.

* cited by examiner

*Primary Examiner*—David Wu
*Assistant Examiner*—Marie Reddick
(74) *Attorney, Agent, or Firm*—Carl F. Ruoff; Andrew J. Anderson

(57) ABSTRACT

The present invention is method of manufacturing a wax dispersion. The method includes forming a solution of a solvent and a dispersant, the dispersant being a polymer of partially or fully hydrogenated styrene butadiene wherein the styrene to butadiene ratio is from 20 to 90. Wax is added to the solution to form a slurry. The particle size of the wax is reduced through communition of the slurry. The wax dispersion can be sued for the manufacture of toner particles.

19 Claims, No Drawings

METHOD OF MANUFACTURING A WAX DISPERSION

FIELD OF THE INVENTION

The present invention relates waxes and, more particularly how to incorporate waxes in electrophotographic toners to improve toner performance.

BACKGROUND OF THE INVENTION

Waxes are incorporated into electrophotographic toners to aid release from the fuser roller surfaces, without the need to use silicone oil. The domain sizes of these materials affect the many properties of the toner, including the powder flow, tribocharging, release and glossing. The domain sizes can be effectively controlled by a separate step of milling the waxes to form a dispersion. For this purpose, it is beneficial to mill the wax in a volatile organic solvent that can be removed after the wax is added to the toner. While the wax domain size can be reduced in milling without an aid, it is usually desirable to have milling aid that can act as a colloidal stabilizer for the wax particles. The stabilizer prevents the agglomeration of the wax particles thereby increasing the efficiency of milling and also reduces the viscosity of the dispersion, thereby allowing a higher wax yield and consequently lower milling costs.

Several patents (U.S. Pat. No. 5,756,244) disclose a method of incorporating wax into to the toner at the compounding step, where all the ingredients of the toner and the wax are added to the equipment such as an extruder, two roll mill, kneader etc. In the molten state of the processing conditions, the viscosities of the wax and the toner binder are typically very different. Under such diverse viscosities, it is not possible to achieve small particles of the wax. The size of the wax domain in the extruded matrix may be equal or smaller than final desired toner size. As a result, when the extruded matrix is pulverized the resulting particles may contain free wax particles or non-homogeneous distribution of wax in the particles, with a high content of surface wax. The surface wax and free wax can adversely affect the performance of the toner in the machine.

It has been found that incorporating fine particles of wax as a dispersion into toners made by a chemical manufacturing process results in toners that have little free wax and low surface wax. There are different methods of making toner by the chemical method. In U.S. 20040161687 A1, the wax particles obtained from the vendor are small in size and are added to a solvent phase containing the rest of the toner materials. This organic phase is dispersed in an aqueous phase containing a water soluble surfactant and viscosity modifier to aid in the dispersion. However, the choice of wax which are manufacturable at the desired small size is limited.

Another method of controlling a domain size of the wax is to mill the wax within a solvent medium. U.S. Pat. Nos. 6,682,866; 6,800,412; and 6,824,945; and U.S. Patent Application No. 2004/0115551 disclose combining a polyester binder, pigment, charge control agent and wax and milling it in the presence of zirconia beads. The organic phase is then dispersed, with controlled shearing, in an aqueous phase containing hydroxylapatite and sodium dodecyl benzene sulfonate as dispersants. The solvent is then removed by evaporation. While this method is useful for creating small domain sizes of the waxes, it is not cost effective to process the entire toner/wax/solvent mixture to reduce the domain size. Secondly, polyesters binder do not adsorb well on to waxes, particularly polyolefin and polyester waxes which results in high degree of flocculation and difficulty in milling.

Other methods of incorporating wax via chemical toner processes are by emulsion aggregation technology. In these cases aqueous dispersions of wax, latex, pigment and charge control agent are mixed in a reactor and aggregated to form toner sized particles. Aqueous dispersions of wax can be prepared by several methods. U.S. Pat. Nos. 6,849,371 and 6,210,853 disclose the preparation of wax dispersions by using a sulfonated polyester as a dispersant, which is also the toner binder, raising the aqueous dispersion temperature to above the melting point of the wax, using a high pressure reactor and then emulsifying the wax. U.S. Pat. No. 6,808,851 discloses a similar preparation method with an anionic surfactant as the stabilizer. U.S. Patent Application No. 20040044108 A1 describes the details of preparing the wax dispersions. While aqueous dispersions of waxes are environmentally more benign than solvent based dispersions, the cost of carrying out high pressure homogenizations is relatively high. Furthermore it is substantially more difficult to carry out the emulsion aggregation process and incorporate the wax, than by using a solvent to dissolve and disperse the toner components.

It is required that dispersions of waxes in solvents be prepared, for incorporating into toners prepared by certain chemical processes. The dispersions are prepared by breaking down the wax particles into sub micron particles using milling media. The cost of preparing these dispersions is proportional to time required to reach the final particle size. Therefore it is beneficial to have a high solid loading in these dispersions, for the reasons of reducing the cost. The choice of dispersant determines the rate of milling. Typically, dispersants that enable fast milling are good stabilizers. That is, they adsorb strongly to the wax particles, and provide a good barrier to particle flocculation. While flocculated dispersions can be milled, they are typically higher in viscosity and hard to handle in the process. Consequently, the particle concentrations in flocculated dispersions cannot be high. The desired stabilizer should be able to produce fast milled dispersions with small particle size and low viscosity.

It is an object of the present invention to provide a wax dispersion in a solvent with a low viscosity at a shear rate less than 0.5 $s^{-1}$ and where the percent of wax in the dispersion is high.

It is another object of the present invention to produce wax dispersions where the particle size is less than 1 um.

It is yet another object of the present invention to produce a wax dispersion where the time of milling is relatively short.

This and other objects of the invention can be accomplished by using a dispersant comprised of a copolymer of styrene and butadiene, where the butadiene is partially or completely hydrogenated.

SUMMARY OF THE INVENTION

The present invention is method of manufacturing a wax dispersion. The method includes forming a solution of a solvent and a dispersant, the dispersant being a polymer of partially or fully hydrogenated styrene butadiene wherein the styrene mole fraction of the polymer is from 20 to 90. Wax is added to the solution to form a slurry. The particle size of the wax is reduced through communition of the slurry. The wax dispersion can be used for the manufacture of toner particles.

DETAILED DESCRIPTION OF THE INVENTION

The wax dispersion of the instant invention is preferably made with a polar solvent where the dispersant is completely or partially soluble in the solvent. The dispersant is a copolymer of styrene and butadiene, where the styrene mole ratio varies from 20% to 90%. The choice of solvent will partially specify the actual styrene mole fraction, because of solubility considerations. The preferred mole fraction in the preferred solvents of ethyl acetate, propyl acetate and dichloromethane is between 50 and 75%. The molecular weight of the polymer can be from 4K daltons to 500 K Daltons. If the molecular weight is too low, the polymer may not provide adequate stability to the wax particles to prevent flocculation. If the molecular weight is too high it will increase the viscosity of the dispersion and may also cause flocculation via "bridging." Furthermore it is desired that the butadiene portion of the dispersant be partially or totally hydrogenated. The mole fraction of the butadiene that is to be hydrogenated is from 2 to 100% and preferably from 30 to 100%.

The wax can be dispersed in a single solvent or a mixture of solvents. In a preferred embodiment of this invention the wax dispersion is used in the preparation of electrophotographic toner prepared with the aid of a solvent as described in U.S. Pat. No. 4,833,060. It is highly preferred that the solvent used for the preparation of the wax dispersion of the current invention, be the same as the one being used to prepare the toner. Solvents that are useful for the preparation of toner as per U.S. Pat. No. 4,833,060, for example, chloromethane, dichloromethane, ethyl acetate, propyl acetate, vinyl chloride, methyl ethyl ketone (MEK), trichloromethane, carbon tetrachloride, ethylene chloride, trichloroethane, toluene, xylene, cyclohexanone, 2-nitropropane, and the like. In some instances it may be more desirable to use a mixture of two or more of the above solvents. The dispersant of the current invention can either be first dissolved/dispersed in the solvent of choice or added simultaneously with the wax that is to be milled.

Any wax may be used for the purpose of the present invention. Examples of such waxes include polyolefins such as polyethylene wax and polypropylene wax. Long chain hydrocarbon wax such as paraffin wax. Another class of waxes are carbonyl group-containing wax which include polyalkanoic acid ester waxes such as montan wax, trimethylolpropane tribehenate, glycerin tribehenate; polyalkanol ester waxes such as tristearyl trimellilate and distearyl maleate; polyalkanoic acid amide waxes such as trimellitic acid tristearyl amide. Examples of useful aliphatic amides and aliphatic acids include oleamide, eucamide, stearamide, behenamide, ethylene bis(oleamide), ethylene bis(stearamide), ethylene bis(behenamide) and long chain acids including stearic, lauric, montanic, behenic, oleic and tall oil acids. Particularly preferred aliphatic amides and acids include stearamide, erucamide, ethylene bis-stearamide and stearic acid. The aliphatic amide or aliphatic acid is present in an amount from about 0.5 to 30 percent by weight, preferably from about 0.5 to 10 percent by weight. Mixtures of aliphatic amides and aliphatic acids can also be used. One useful stearamide is commercially available from Witco Corporation as Kemamide S™. A useful stearic acid is available from Witco Corporation as Hysterene 9718™. Naturally occurring polyalkanoic acid ester waxes include Carnauba wax. A particularly useful class of ester waxes are made from long chain fatty acids and alcohol. Examples of this class are Licowax series made by Clariant Corp. derived from montanic acid. Another example useful in toner applications are the WE series made by NOF which is a highly purified narrow melting solid ester wax. Fluorinated waxes such as polyfluo 190, Polyflo 200, Polyfluo 523XF, Aqua Polyfluo 411—all polyethylene/PTFE functionalized waxes, Aqua Polysilk 19, Polysilk 14,—all polethylene/PTFE/amide functionalized waxes available from Micro Powders INC are also useful. In some applications it may be useful to use more than one of the above waxes together to prepare the dispersion, particularly if the combination of waxes in the final application is useful.

Although the wax used in the present invention can have a broad range of applications, it is generally desired for toner applications that the wax have a melting point of 40-160° C., preferably 50-120° C., more preferably 60-90° C. A melting point of wax below 40° C. may adversely affect the heat resistance and preservability of the toner, while too high a melting point, i.e. in excess of 160° C. is apt to cause cold offset of toner when the fixation is performed at a low temperature. Additionally, the melting peak of wax as obtained by methods such as differential scanning calorimetry and it is preferred that the onset of melting to the peak melting temperature be less than 10° C. Preferably, the wax has a melt viscosity of 5-1000 cps, more preferably 10-100 cps, at a temperature higher by 20° C. than the melting point thereof. When the viscosity is greater than 1000 cps, the anti-hot offset properties and low fixation properties of the toner are adversely affected. The amount of the wax in the toner is generally 1-40% by weight, preferably 3-10% by weight, based on the weight of the toner.

The wax dispersion of the instant invention can be prepared by any one of several comminution processes. These include high shear dispersers like the IKA mill, Kady mill or a Gaulin. Equipment used to homogenize emulsions may also be used, particularly where the wax particles are brittle. Media milling techniques are particularly useful for comminution of solid particles. Media milling can be accomplished by an attriter, a ball mill, a sand mill or a vibration mill using media made of silica, silicon nitride, sand, zirconium oxide, alumina, titanium, glass, etc. The bead sizes typically range from 0.25 to 3.0 mm in diameter. The volume of the media can be from 5 to 200% of the volume of the solution containing the wax particles. The slurry containing the solvent with dissolved/dispersed polymer and wax particles added to the mill where repeated collisions of the milling media with the solid wax particles result in fracture and consequent particle size reduction. The milling process is continued till the desired particle size of the wax is obtained.

The slurry that is being milled contains one or more solvents described earlier, one or more types of waxes described above and at least one dispersant comprising a hydrogenated styrene-butadiene copolymer. The amount of wax particles in the slurry can be from 0.1% to 50%. If the wax dispersion is further used to make electrophotographic toner, the time involved in processing a given amount of wax is directly proportional to the cost of making the toner. In order to maximize productivity and minimize the cost, it is desired that the wax content in the slurry be high as possible. However, if it is too high, the viscosity of the slurry becomes high which can decrease the efficiency of milling (increase time for milling) and reduce the yield because it is hard to separate from the milling media. The rheological profile of the solid particle dispersion is typically shear thinning—i.e. its viscosity decreases as the rate of shear imparted increases. A partially stabilized or unstable dispersion will typically exhibit an extreme case of shear thinning where the viscosity at low shear rates (<0.5 $s^{-1}$) is high. In an extreme case an unstable, flocculated dispersion may exhibit a yield stress and may not flow at the low shear rates. The proper choice of dispersant, such as the one described in the instant invention, will stabilize the particles and reduce the viscosity at low shear rates.

In order to make the wax milling process economically viable it is desired that the low shear viscosity of the milled dispersion, measured at 0.5 $s^{-1}$, be lower than 500 cp when the wax level is at about 10%. In order to achieve the low viscosity at the low shear rates, the dispersant comprising the partially or totally hydrogenated styrene-butadiene polymer should be present at a level from between 2 to 50% based on the amount of wax present. The preferred amount is from 5 to 20%. If the level is too low, there will not be enough dispersant to stabilize the wax particles when the size is reduced. If the level is too high, then polymer will comprise a significant portion of the toner when the dispersion is used to prepare the toner.

In a preferred embodiment it is desired that the dispersion of the instant invention be used in the preparation of toner. It is well known in the art that in order for the wax to perform well as a release agent upon fusing that the wax blooms to the surface of the toner. However, prior to the fusing step it is also desired that the wax be encapsulated by the toner binder. In order for this to happen, the wax particle size should be substantially smaller than the final desired size of the toner particle. The predispersed wax can be added to the extrusion step that is the first step of a conventional melt pulverized toner (MPT method). In this step all the components of the toner are extruded and mixed at elevated temperatures. Because the viscosity of the molten wax is much lower than the viscosity of the molten toner binder, the extrusion step cannot disperse or break down large particles of wax. Therefore, it is advantageous to comminute the particles as described above and add them to the extrusion step. Furthermore, it is more advantageous to disperse the wax in an organic solvent, instead of an aqueous medium, because dispersants used in aqueous dispersion processes can cause the toner to become sensitive to the relative humidity from the tribo-charging perspective.

The wax dispersion of the instant invention can be used to make toner in by the MPT method mentioned above. Ingredients of the toner such as a binder including a modified polyester resin, a coloring agent, the wax dispersion and a charge control agent are mechanically mixed with each other using a mixer such as a rotary blade mixer to obtain a mixture.

The mixture is then kneaded using a suitable kneader. A single axis type (or single cylinder type) kneader, a two axis type (or two cylinder type) continuous extruder or a roll mill may be suitably used as the kneader. The kneading should be performed at a temperature near the softening point of the binder resin so as not to cause breakage of the molecular chain of the binder resin. Too high a temperature above the softening point will cause breakage of the molecular chain of the binder resin. The dispersion of the coloring agent, etc. in the binder resin will not sufficiently proceed when the temperature is excessively lower than the softening point.

The kneaded mixture is then solidified and the solidified mixture is ground, preferably in two stages, coarsely grinding and finely grinding. The coarsely grinding stage may be carried out by impinging the solidified mixture to an impact plate under a jet stream, while the finely grinding stage may be performed using a combination of a rotor and a stator with a small gap. The ground mixture is classified in a jet flow utilizing tangential force to obtain a toner having an average size of, for example, 5-20 µm.

The obtained toner is, if desired, mixed with an external additive such as a fluidizing agent to improve the fluidity, preservability, developing efficiency and transfer efficiency. The mixing with the external additive may be carried out using a conventional mixer preferably capable of controlling the mixing temperature. The external additive may be added gradually or at once. The rotational speed, mixing time and mixing temperature may be varied in any suitable manner.

Illustrative of suitable mixers are V-type mixers, rocking mixers, Ledige mixers, nauter mixers and Henschel mixers.

A preferred method of using the wax dispersions to make toner is via chemical means. While there are several methods described in the art to make toner via chemical means, the dispersion of the instant invention is mainly useful in processes that dissolve/disperse the toner components in a solvent phase. Such methods are disclosed in U.S. Pat. Nos. 4,833,060; 4,965,131; 6,682,866; 6,800,412; and 6,544,705; and U.S. Patent Application No. 20040161687 A1. In a preferred embodiment the toner is prepared by dissolving/dispersing the binder, optionally one or more pigments, one or more charge control agents in one or more of the preferred solvents. The wax dispersion of the instant invention is added to this mixture and mixed well. The order of adding the dispersion is not important.

An aqueous phase containing a stabilizer is prepared. The preferred stabilizer is a particulate dispersing agent and a promoter which drives the particulate dispersing agent to the interface between the water layer and the polymer solvent droplets formed by the agitation on the system. Suitable colloidal stabilizing agents known in the art of forming polymeric particles by the addition reaction of ethylenically unsaturated monomers by the limited coalescence technique can be employed such as, for example, inorganic materials such as, metal salt or hydroxides or oxides or clays, organic materials such as starches, sulfonated crosslinked organic homopolymers and resinous polymers as described, for example, in U.S. Pat. No. 2,932,629; silica as described in U.S. Pat. No. 4,833,060; and copolymers such as copoly (styrene-2-hydroxyethyl methacrylate-methacrylic acid-ethylene glycol dimethacrylate) as described in U.S. Pat. No. 4,965,131, all of which are incorporated herein by reference. Silica is the preferred suspension stabilizing agent for use in accordance with this invention. The $SiO_2$ dispersing agent generally should have dimensions such that they are from about 0.001 µm to about 1 µm preferably from about 5 to 150 nanometers and most preferably from about 5-75 nanometers. The size and concentration of these particles controls and predetermines the size of the final toner particle. Examples of colloidal silica dispersing agents are sold under the brand names of Ludox, Nalcoag and Snowtex among others. Colloidal silicas are naturally charged negatively at ph greater than 2 and these are the preferred stabilizers. However, silica modified with alumina are positively charged and are also suitable as a stabilizer.

Suitable promoters to drive the suspension stabilizing agent to the interface of the lubricant droplets and the aqueous phase include sulfonated polystyrenes, alginates, carboxymethyl cellulose, tetramethyl ammonium hydroxide or chloride, triethylphenyl ammonium hydroxide, triethylphenyl ammonium hydroxide, triethylphenyl ammonium chloride, diethylaminoethylmethacrylate, gelatin, glue, casein, albumin, gluten, methoxycellulose, and the like. A particularly suited promoter is a water-soluble soluble condensation product of diethanol amine and adipic acid, such as poly(adipic acid-co-methylaminoethanol), water soluble condensation products of ethylene oxide, urea, and formaldehyde and polyethyleneimine. In the case of colloidal silica as stabilizer, it is generally desired to control the pH of the system at a value of from about 2 to about 7, preferably from about 3 to 6 and most preferably 4. The promoter should be present in an amount of 1 to about 50 percent based on the amount of silica.

The dispersion of the solvent drops containing the binder and the dispersant in the aqueous medium is then vigorously mixed by any suitable device including high speed agitation, ultrasonic devices, homogenizers, and the like in order to reduce the particle size of the lubricant droplets to less than that ultimately desired. The presence of the particulate suspension stabilizer then controls the level of coalescence that takes place until an equilibrium is reached and the particle size does not grow any farther.

The solvent is next removed from the droplets by any suitable technique, such as, for example, heating the entire system to vaporize the solvent and thus remove it from the discontinuous phase droplets remaining in the aqueous solution surrounded by the $SiO_2$ particles. The solvent can also be removed by purging the stirred dispersion with air or an inert gas like nitrogen. U.S. Pat. No. 5,580,692 discloses a method by which excess water is added to the dispersion that extracts the solvent. The particles are separated from the water/solvent mixture by filtration.

Next, should it be desired, the $SiO_2$ dispersing agent may be removed from the surface of the polymer particles by any suitable technique such as dissolving in HF or other fluoride ion or by adding an alkaline agent such as potassium hydroxide to the aqueous phase containing the polymer particles to thereby raise the pH to at least about 12 while stirring. This method is preferred. Subsequently to raising the pH and dissolving the silica, the polymer particles can be recovered by filtration and finally washed with water or other agents to remove any desired impurities from the surface thereof. The toner particles thus produced can be dried and surface treated to produce usable toner for electrophotographic engines.

The term charge-control agent refers to a toner addendum used to modify the triboelectric charging properties of the resulting toner. A very wide variety of charge control agents for positive and negative charging toners are available. Suitable charge control agents are disclosed, for example, in U.S. Pat. Nos. 3,893,935; 4,079,014; 4,323,634; and 4,394,430; and British Patent Numbers. 1,501,065 and 1,420,839 all of which are incorporated in their entireties by reference herein. Additional charge control agents which are useful are described in U.S. Pat. Nos. 4,624,907; 4,814,250; 4,840,864; 4,834,920; 4,683,188; and 4,780,553 all of which are incorporated in their entireties by reference herein. Mixtures of charge control agents can also be used. Particular examples of charge control agents include chromium salicylate organo-complex salts, and azo-iron complex-salts, an azo-iron complex-salt, particularly ferrate (1-), bis[4-[(5-chloro-2-hydroxyphenyl)azo]-3-hydroxy-N-phenyl-2-naphthalenecarb oxamidato(2-)], ammonium, sodium, and hydrogen (Organoiron available from Hodogaya Chemical Company Ltd.).

EXAMPLES

Example 1

Wax Dispersion Preparation

The polymeric dispersant is first dissolved in the solvent of choice. The solvent in this instance is ethyl acetate. Three dispersants were used:

a) Tuftec P2000 (made by AKA elastomer) which is a partially hydrogenated styrene butadiene polymer. The styrene amount is 61%. 60% of the butadiene is hydrogenated;

b) Piccotoner 1221 (made by Hercules) which is a styrene butylacrylate polymer where the styrene mole % is 80; and c) Brij93 (polyoxyethylene (2) oleyl ether, made by ICI).

0.5 gms of each dispersant was separately dissolved in 45 gms of solvent. The solution was transferred to a 4 oz glass jar, to which 35 ml of 2 mm zirconia beads were added. To each jar, 5 gms of Polywax 500 (polyethylene wax of MW 500, from Baker Huges) T-60 (60 μm powder) grade was added. The wax level in the dispersion was about 10%. Each jar was rolled for 4 days at 30 rpm. At the end of the period the contents of the jar were poured into a funnel with a mesh screen to separate out the beads. The dispersions made with the Piccotoner 1221 and the Brij93 were pasty and did not flow well, whereas the dispersion made with the Tuftec P2000 flowed relatively easily and separated from the media.

The example was repeated with a different wax. LicowaxF which a montanic acid ester wax (made by Clariant) comes as millimeter sized flakes, which was used instead of the Polywax 500. Once again, the dispersions made with the Piccotoner 1221 and the Brij 93 as the dispersants were viscous and the dispersion made with Tuftec P2000 was fluid.

Example 2

A similar experiment was carried out with the following dispersants:

a) Tuftec P2000;

b) Tuftec H1043 (Styrene-butadiene polymer where the styrene level is at 61 mol % and where all the butadiene has been hydrogenated, made by AKA Elastomer); and c) Sartomer EF40 (Styrene-maleic anhydride polymer with 80 mol % styrene, made by Sartomer).

Each dispersant was tested with the following wax types:

i) Polywax 500 T60 grade ii) Licowax-F flakes iii) WE3 (ester of long chain fatty acid with an alcohol, made by NOF Corp). These were also flakes similar to the Licowax The milling media used for the Licowax and the WE-3 waxes was 5 mm stainless steel balls. The milling media used for the smaller sized PW500 was the 2 mm zirconia beads. The volume of the milling media was fixed at 35 ml for all experiments. After 24 hours of rolling at 30 rpm, the contents of the jars were drained. The fluidity of the dispersions were observed and the appearance of the wax particles under the microscope.

|  | Tuftec P2000 | Tuftec H1043 | Sartomer EF40 |
| --- | --- | --- | --- |
| Polywax 500 (T60) | Fluid dispersion, well dispersed | Fluid dispersion, well dispersed | Viscous paste, flocculated particles |
| Licowax F | Fluid dispersion, well dispersed | Fluid dispersion, well dispersed | Less fluid and flocculated particles |
| WE-3 | Fluid dispersion, well dispersed | Fluid dispersion, well dispersed | Fluid dispersion, large particles |

The dispersions prepared with the dispersants of the instant invention have low viscosity and well behaved with respect to the particle flocculation. The styrenic polymer by comparison does not give high quality dispersions.

Example 3

The dispersants of the instant invention had some degree of hydrogenation to the butadiene segment of the polymer. In this example, we compare it with non-hydrogenated styrene butadiene polymers. The properties of the polymers tested are given below:

|              | styrene mol % | copolymer     | degree of hydrogenation |
|--------------|---------------|---------------|-------------------------|
| Kraton D1118 | 31            | butadiene     | none                    |
| Kraton D1116 | 23            | butadiene     | none                    |
| Kraton D1102 | 28            | butadiene     | none                    |
| Kraton D1184 | 31            | butadiene     | none                    |
| Piccotoner 1221 | 80         | butyl acrylate | none                   |
| Tuftec P2000 | 61            | butadiene     | 60%                     |

The experimental procedure described in Example 1 was followed for each of the dispersants listed above. After the dispersion was separated from the milling media, the wax percent in the dispersion was adjusted to 10%, by adding the appropriate amount of solvent. The viscosity of the dispersion was measured in a Haake rheometer, using the double gap geometry. In each case the dispersion was sheared at 3000 $s^{-1}$ at which point any aggregates were broken up and the viscosity was steady with time. The shear rate was ramped down to 0.5 $s^{-1}$. The shear rate was then held for 5 min at 0.5 $s^{-1}$ and the change in viscosity with time was recorded. The viscosities of the dispersion are reported at the high shear rate (3000 $s^{-1}$) and the low shear rate (0.5 $s^{-1}$), obtained from the shear rate ramp. Furthermore, the change in viscosity over the 5 minute period of low shear is also reported. The first two measurements reveal the fluidity of the dispersions under extremes of shear which can be experienced in the manufacturing process. The change in viscosity at constant shear rate reveals the rate of aggregation of the wax particles due to intrinsic colloidal instabilities. The table below shows the measured viscosities under the different conditions.

|              | visc. at 3000 s−1 cp | visc at 0.5 s−1 cp | visc. Increase at 0.5 s−1 cp |
|--------------|----------------------|--------------------|------------------------------|
| Kraton D1118 | 4.2                  | 1466               | 401                          |
| Kraton D1116 | 4.29                 | 1721               | 832                          |
| Kraton D1102 | 5.5                  | 1299               | 1733                         |
| Kraton D1184 | 5.84                 | 1630               | 1602                         |
| Piccotoner 1221 | 5.75              | 2035               | 378                          |
| Tuftec P2000 | 2.97                 | 363                | 194                          |

All the polymeric dispersants, except for the one of the instant invention (Tuftec P2000), shows a higher viscosity at the low and high shear rates and particularly at the low shear rate. Furthermore they also exhibit significant viscosity rise at the low shear rate, indicating that they are more prone to flocculation.

Example 4

Effect of Dispersant Level

Two dispersants (Tuftec P2000 and Tuftec H1043) were used in this example. The total percent solids (dispersant+wax) was kept constant in these experiments at 20%. The dispersant levels variations were at 5, 10 and 15% based on the amount of wax, for each dispersant. 10 gms solids (Polywax500+dispersant) was added to 40 gms of ethyl acetate in a 4 oz glass jar. 35 ml of 2 mm zirconia beads was added to the jar and the jar was put on to a Sweco mill which was vibrated for 24 hours. After the milling period, the dispersions were separated from the media. The rheology was measured on the Haake rheometer, using the same shear rate sweep as in example 3. Table below shows the viscosity measured at the low shear rate, high shear rate and the viscosity change over 5 min at the low shear rate

| dispersant | gms wax | gms dispersant | visc. At 5 s−1 | visc. At 3000 s−1 | visc. Change in 5 min at 5 s−1 |
|------------|---------|----------------|----------------|-------------------|-------------------------------|
| P2000      | 9.5     | 0.5            | 2909           | 3.9               | 1594                          |
| P2000      | 9       | 1              | 2118           | 9.95              | 2556                          |
| P2000      | 8.5     | 1.5            | 618            | 8.03              | 119                           |
| H1043      | 9.5     | 0.5            | 3680           | 11.5              | 1878                          |
| H1043      | 9       | 1              | 674            | 7                 | 789                           |
| H1043      | 8.5     | 1.5            | 302            | 6.55              | 226                           |

With both the dispersants of the current invention, increasing the amount of dispersant relative to the wax amount, provides for more fluid and also stable dispersions.

Example 5

The dispersions made with the three waxes and the dispersants of the instant invention in Example 2 (i.e. Polywax 500/Tuftec P2000, Polywax 500/Tuftec H1043, Licowax F/Tuftec P2000, LicowaxF/Tuftec H1043, WE3/Tuftec P2000 and WE3/Tuftec H1043) were used to prepare toner particles.

Preparation of the Solvent Phase:

For each toner the solvent phase included mixing 2.9 gms of a cyan flush of copper phthalocyanine (40/60 in a polyester binder), 19.3 gms of polyester binder—tuftone NE303 made by Kao Corporation, a total of 102 gms of wax dispersion and solvent, ethyl acetate. The actual amount of wax dispersion added was calculated to have exactly 2.5 gms of wax, which corresponds to 10 parts of wax per hundred parts of total solids in the solvent phase.

Preparation of the Aqueous Phase

The aqueous phase was prepared by first dissolving 1.5 gms of potassium hydrogen phthalate buffer in 237.5 gms of water. 10 gms of Nalco 1060 (a 50% solution of colloidal silica, with 50 nm particle size) and 0.15 gms of poly(adipic acid-co-methylaminoethanol) as the promoting agent.

Preparation of Dispersion

The solvent phase was added to the aqueous phase with intense mixing using a Lab Silverson mixer at 2000 rpm. After approximately 1 min of mixing, the entire dispersion was passed through a Microfluidics Microfluidizer H-110, as a homogenizer. After homogeinizing, the dispersion was evaporated under 25 in Hg vacuum and 50 C to remove the ethyl acetate solvent. The resulting dispersion, containing toner particles were isolated as follows:

The dispersion was first filtered through a fine fritted glass funnel. The wet cake of particles was transferred to a beaker along with 400 ml of 0.1N KOH, and stirred for two hours, after which it was filtered once more and the cake was treated with the above amount of alkali solution for one hour. The final mixture was filtered and then washed with DI water till the conductivity of the filtrate was below 10 µS/cm. The cake was dried in a vacuum oven overnight under full vacuum and 40 C. The particles were sieved to deagglomerate the clumps, resulting in toner particles. The particle size distribution was measured using a Coulter Multisizer II. The median volume size is reported along with two parameters—a fineness index is defined as the ratio of the diameters at 50% vs 16% from the number weighted cumulative distribution curve, a coarseness index is defined as the ratio of the diameters at 84% vs 50% from the volume weighted cumulative distribution curve $$\text{Fineness Index } FI = \frac{D_{50(num)}}{D_{16(num)}}$$

$$\text{Coarseness Index } CI = \frac{D_{84(vol)}}{D_{50(vol)}}$$

The fineness index is a measure of the undersize particles in the distribution, while the coarseness index is a measure of oversized particles in the distribution. The table below shows the particle size data for the toner particles containing 10 pph of wax, prepared with dispersions containing the dispersant of the instant invention.

| wax type | dispersant | vol median um | FI | CI |
|---|---|---|---|---|
| none | none | 6.57 | 1.14 | 1.11 |
| PW500 | Tuftec P2000 | 7.11 | 1.18 | 1.12 |
| PW500 | H1043 | 7.43 | 1.28 | 1.19 |
| Licowax-F | Tuftec P2000 | 4.29 | 1.27 | 1.19 |
| Licowax-F | H1043 | 4.34 | 1.33 | 1.21 |
| WE-3 | Tuftec P2000 | 4.60 | 1.38 | 1.63 |
| WE-3 | H1043 | 3.83 | 1.26 | 1.76 |

The dispersants of the instant invention are applicable with most wax types and we are able to make toner particles with them.

The invention has been described in detail with particular reference to certain preferred embodiments thereof, but it will be understood that variations and modifications can be effected within the spirit and scope of the invention.

The invention claimed is:

1. A method of manufacturing a wax dispersion comprising:
   forming a solution of an organic solvent and a dispersant comprising a partially or fully hydrogenated styrene-butadiene copolymer wherein the styrene mole fraction of the copolymer is from 20 to 90 percent;
   adding wax to the solution to form a slurry; and
   reducing the particle size of the wax through communition of the slurry.

2. The method of claim 1 wherein the wax is selected from the group consisting of polyolefin waxes, carbonyl group-containing waxes, polyalkanoic acid ester waxes, polyalkanol ester waxes, polyalkanoic acid amide waxes, and fluorinated waxes.

3. The method of claim 1 wherein a mole fraction of the butadiene portion of the co-polymer that is hydrogenated is from 2 to 100 percent.

4. The method of claim 1 wherein the wax has a mean particle size of less than 1 micron after communition.

5. The method of claim 1 wherein the solvent is selected from the group consisting of chloromethane, dichloromethane, ethyl acetate, propyl acetate, methyl ethyl ketone (MEK), trichloromethane, carbon tetrachloride, ethylene chloride, trichloroethane, toluene, xylene, cyclohexanone, and 2-nitropropane.

6. The method of claim 1 wherein the communition is carried out by media milling.

7. The method of claim 1 wherein the wax has a melting point of from 40-160° C.

8. The method of claim 1 wherein the wax has a melt viscosity of 5-1000 cps.

9. The method of claim 1 wherein the amount of wax particles in the slurry is from 0.1 to 50 weight percent.

10. A method of manufacturing a toner comprising:
    dissolving a toner binder in an organic solvent;
    adding a wax dispersion formed by the method of claim 1 to said solvent, said wax dispersion formed by;
       forming a solution of an organic solvent and a dispersant comprising a partially or fully hydrogenated styrene-butadiene copolymer wherein the styrene mole fraction of the co-polymer is from 20 to 90 percent;
       adding wax to the solution to form a slurry; and
       reducing the particle size of the wax through communition of the slurry;
    emulsifying the resulting solvent phase with an aqueous solution containing a stabilizer to form an emulsion;
    removing the solvent from the emulsion to from toner particles;
    washing said toner particles; and
    drying said toner particles.

11. The method of claim 10 wherein the wax is selected from the group consisting of polyolefin waxes, carbonyl group-containing waxes, polyalkanoic acid ester waxes, polyalkanol ester waxes, polyalkanoic acid amide waxes, and fluorinated waxes.

12. The method of claim 10 wherein a mole fraction of the butadiene portion of the co-polymer that is hydrogenated is from 2 to 100 percent.

13. The method of claim 10 wherein the wax has a mean particle size of less than 1 micron after communition.

14. The method of claim 10 wherein the solvent is selected from the group consisting of chloromethane, dichloromethane, ethyl acetate, propyl acetate, methyl ethyl ketone (MEK), trichloromethane, carbon tetrachloride, ethylene chloride, trichloroethane, toluene, xylene, cyclohexanone, and 2-nitropropane.

15. The method of claim 10 wherein the communition is carried out by media milling.

16. The method of claim 10 wherein the amount of the wax in the toner particles is from 1-40 percent by weight based on the weight of the toner particles.

17. A method of manufacturing a toner comprising:
    providing a binder composition;
    adding a wax dispersion formed by the method of claim 1 to said toner binder to form a mixture, said wax dispersion formed by:
       forming a solution of an organic solvent and a dispersant comprising a partially or fully hydrogenated styrene-butadiene copolymer wherein the styrene mole fraction of the co-polymer is from 20 to 90 percent;
       adding wax to the solution to form a slurry; and
       reducing the particle size of the wax through communition of the slurry;
    kneading the mixture; and
    grinding the mixture to form a toner.

18. The method of claim 17 wherein the mixture further comprises charge control agents and colorants.

19. The method of claim 17 wherein a fluidizing aid is added to the mixture.

* * * * *